United States Patent
Eichinger et al.

(10) Patent No.: US 9,893,783 B2
(45) Date of Patent: Feb. 13, 2018

(54) METHOD, MOBILE STATION AND BASE STATION FOR TRANSMITTING DATA IN MOBILE COMMUNICATION SYSTEM

(75) Inventors: Josef Martin Eichinger, Neufinsing (DE); Volker Jungnickel, Berlin (DE); Egon Schulz, München (DE); Wolfgang Zirwas, München (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 1390 days.

(21) Appl. No.: 12/311,737

(22) PCT Filed: Oct. 11, 2007

(86) PCT No.: PCT/EP2007/060839
§ 371 (c)(1),
(2), (4) Date: Mar. 23, 2010

(87) PCT Pub. No.: WO2008/043817
PCT Pub. Date: Apr. 17, 2008

(65) Prior Publication Data
US 2010/0189079 A1    Jul. 29, 2010

(30) Foreign Application Priority Data

Oct. 11, 2006 (EP) .................................... 06021367
Oct. 11, 2006 (EP) .................................... 06023682

(51) Int. Cl.
*H04B 7/06* (2006.01)
*H04L 5/00* (2006.01)
*H04B 7/04* (2017.01)

(52) U.S. Cl.
CPC ......... *H04B 7/0617* (2013.01); *H04B 7/0482* (2013.01); *H04B 7/0639* (2013.01);
(Continued)

(58) Field of Classification Search
CPC .. H04B 7/0639; H04B 7/0617; H04B 7/0641; H04B 7/0669
(Continued)

(56) References Cited

U.S. PATENT DOCUMENTS

2006/0056531 A1    3/2006 Li et al.
2006/0067277 A1    3/2006 Thomas et al.
(Continued)

OTHER PUBLICATIONS

International Search Report for PCT/EP2007/060839 dated Jan. 30, 2008.

*Primary Examiner* — Asad Nawaz
*Assistant Examiner* — Saad A Waqas
(74) *Attorney, Agent, or Firm* — Brake Hughes Bellermann LLP

(57) ABSTRACT

Data in a mobile communications system is transmitted on at least one channel between at least one base station with multiple antennas and at least one user equipment. A base station applies precoding to the data based on a set of predefined codebooks. A first tracking mode with a first codebook from the set of predefined codebooks is used for the precoding, and at least a second tracking mode with at least a second codebook from the set of predefined codebooks is used for the precoding. The base station switches between the first tracking mode and the second tracking mode depending on at least one condition of the channel.

22 Claims, 2 Drawing Sheets

(52) U.S. Cl.
CPC ......... *H04B 7/0641* (2013.01); *H04B 7/0669* (2013.01); *H04L 5/0023* (2013.01); *H04L 5/0037* (2013.01); *H04L 5/0058* (2013.01)

(58) Field of Classification Search
USPC ........................................................ 370/204
See application file for complete search history.

(56) References Cited

U.S. PATENT DOCUMENTS

| | | | | |
|---|---|---|---|---|
| 2007/0149181 A1* | 6/2007 | Lin | ...................... | H04B 7/0417 455/415 |
| 2007/0265037 A1* | 11/2007 | Pan | ................... | H04L 25/03343 455/563 |
| 2008/0043865 A1* | 2/2008 | Kim | ..................... | H04B 7/0417 375/260 |
| 2008/0080634 A1* | 4/2008 | Kotecha | ............... | H04B 7/0417 375/267 |
| 2008/0168337 A1* | 7/2008 | Gaal | ..................... | H04L 5/0094 714/784 |
| 2010/0266054 A1* | 10/2010 | Mielczarek | .......... | H04B 7/0434 375/260 |

* cited by examiner

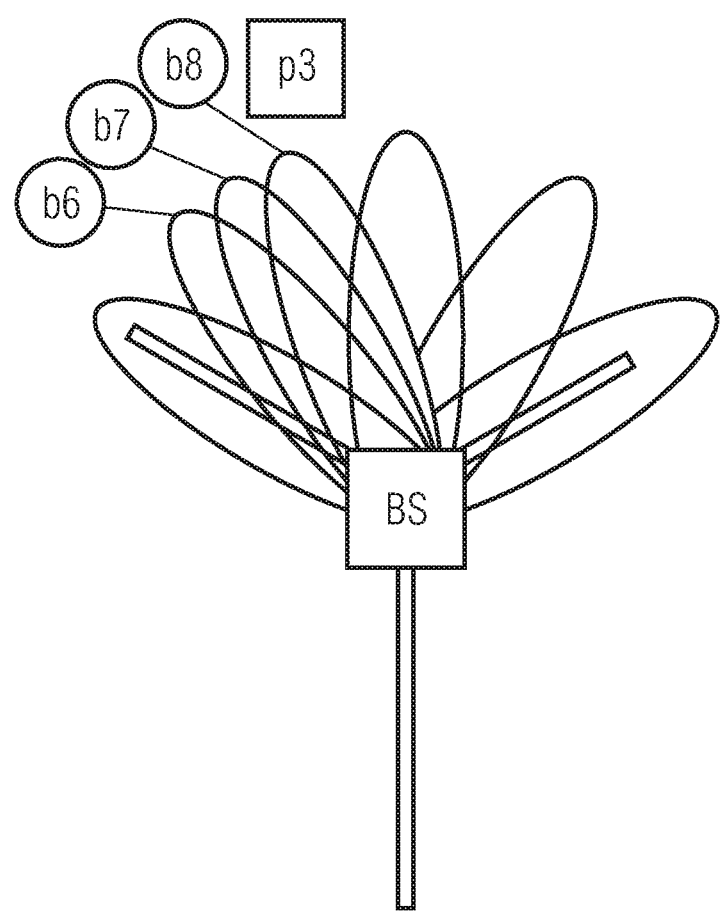

METHOD, MOBILE STATION AND BASE STATION FOR TRANSMITTING DATA IN MOBILE COMMUNICATION SYSTEM

CROSS REFERENCE TO RELATED APPLICATIONS

This application is a U.S. national stage of International Application No. PCT/EP2007/060839, filed Oct. 11, 2007 and claims the benefit thereof. The international application claims the benefits of European Application Nos. 06021367 and 06023682, both filed on Oct. 11, 2006, all applications are incorporated by reference herein in their entirety.

BACKGROUND

Described below is a method, mobile station and base station for transmitting data in a mobile communications system. Particularly, the method is for transmitting codebook-based precoded data in a multiple antenna communications system.

A mobile communications system, particularly a wireless cellular system, is organised in form of neighbouring cells with each cell being served by a base station (BS). The base station provides communication facilities to and from mobile stations, i.e. user equipments (UE).

The Universal Mobile Telecommunications System (UMTS) is one of the third-generation (3G) mobile phone technologies. The long term evolution (LTE) of UMTS, i.e. the successor technology to 3G, also called fourth-generation technology (4G), is standardised in the 3rd Generation Partnership Project (3GPP).

One important aspect of LTE is precoding in multiple antenna communications systems, e.g. multiple input multiple output (MIMO) or multiple input single output (MISO) communications systems. In the following, the term MIMO includes variants like MISO or single input multiple output (SIMO) communications systems.

MIMO systems have become more and more important in recent years as they allow for increased channel capacity, higher reliability, and better range of these systems compared to single antenna systems. The main advantages of MIMO systems include a diversity gain, characterizing the system reliability with respect to fading, and a multiplexing gain, characterizing the system's capacity.

Precoding is used in transmitters to compensate for distortion introduced by the channel response and/or noise whitening filters used in the modem receivers.

Precoding denotes methods applied at a transmitter facilitating detection at a receiver. I.e., precoding is used in the transmitter in order to compensate for distortions on a communications channel.

As a drawback, precoding causes a feedback overhead which might become very high without careful design of the feedback link from user equipment to base station.

To overcome the drawback of a high feedback overhead, precoding based on codebooks was introduced. A codebook is a predefined set of precoding matrices with each precoding matrix being identified by a precoding matrix index. Therefore, a user equipment planning to establish a connection estimates the channel quality. Instead of sending the complete channel matrix back to the base station as feedback, the user equipment only selects and sends back the index of the best fitting precoding matrix out of a codebook.

As a further improvement, a tracking modus has been suggested for codebooks in 3GPP LTE. The tracking modus is useful in case of moving UEs or time varying radio channels as not the full codebook index has to be fed back from user equipment to BS. Instead, only a delta index is sent back from the UE. The delta index can be transmitted with fewer bits than the full index, as only a small part of the whole codebook will be a possible candidate for the next selection of a precoding matrix.

In case of beam forming—a special type of precoding where a signal processing technique is used to control the directionality of the reception or transmission of a signal—a codebook might define a regular set of beams within a given sector. When a user equipment is moving, only the adjacent beams are possible candidates for the next selection. In case of many antenna elements at the base station and a very accurate selection of the best beam, the codebook will have a large size. If the codebook size is reduced to minimize the feedback overhead, performance degradation due to sub-optimum precoding is the drawback.

Tracking allows reducing the feedback overhead, but if the codebook size is too small the achievable accuracy is limited.

For more advanced MIMO algorithms like joint transmission or non linear precoding where also interference between more than one beam occurs and where the transmission power as well as the beam angle has to be adapted very accurate, a small codebook size will lead to significant degradations while a large codebook size will increase the feedback overhead too much.

It is an aim of embodiments to address at the problem discussed above. One particular aim is to maximise precoding performance despite a limited codebook size.

SUMMARY

The method provides for transmitting data in a mobile communications system, wherein the data is transmitted on at least one channel between at least one base station with multiple antennas and at least one user equipment. The base station applies precoding to the data based on a set of predefined codebooks. A first tracking mode with a first codebook from the set of predefined codebooks is used for the precoding, and at least a second tracking mode with at least a second codebook from the set of predefined codebooks is used for the precoding. The base station switches between the first tracking mode and the second tracking mode depending on at least one condition of the channel.

Furthermore, the method may be implemented using a base station and a user equipment and an according communications system.

The method provides the advantage that precoding performance is maximised despite a limited codebook size.

In a further refinement of the method, the condition is determined by measuring a variability of the channel. This variability is then compared with a threshold.

In a further refinement of the method, the base station switches to the first tracking mode in case of the variability of the channel exceeding the threshold.

In a further refinement of the method, the base station switches to the second tracking mode in case of the variability of the channel being equal to or falling below the threshold.

In a further refinement of the method, the condition is determined based on at least a long term channel estimation regarding the channel.

In a further refinement of the method, the base station switches between the first tracking mode and the second tracking mode based on a trigger.

In a further refinement of the method, the trigger is sent to the base station by the user equipment.

In a further refinement of the method, each codebook in the set of predefined codebooks is a predefined set of precoding matrices. Each precoding matrix is identified by a precoding matrix index.

In a further refinement of the method, the precoding is achieved by applying beamforming.

The basis for the method is a modified tracking modus. The assumption is that more advanced MIMO algorithms like joint transmission or nonlinear precoding are useful only for slow moving user equipments where the radio channel is stable over longer time periods. Additionally, many radio channels have a very small subspace dimension, i.e. only few multipath components. It has been shown that for low subspace dimensions a very accurate channel prediction is possible with very small feedback. E.g., in case of a open space LOS connection one phase value would be enough to predict the radio channel.

A tracking modus as described above does not help to increase accuracy. Furthermore, it decreases the feedback overhead. For this reason it proposed here to have two different tracking modes. The first, coarse tracking mode as described above is used e.g. in case of moving user equipments. Based on the actual codebook selection, the next codebook selection is determined by a difference value to the actual value. This difference value is transmitted from the user equipment to the base station.

A second tracking mode also selects a new codebook entry based on the actual, active codebook selection. In contrast to the first tracking mode, the second tracking mode is used to increase the precoding accuracy. Therefore, in each tracking step a codebook entry with a finer resolution is selected. Under the assumption of a constant feedback rate for each feedback step the accuracy is improved, which will lead to increased system performance if appropriate algorithms are being used.

In the beginning when the precoding accuracy is low, a more robust transmission—e.g. higher coding rate and/or smaller modulation format—is selected. With increasing accuracy higher modulation and/or coding schemes can be selected.

In one embodiment, the two different MIMO tracking modes are selected based on a long term channel estimation performed by the user equipment. This is for instance done based on common pilot signals transmitted by the base station on the Common Pilot Channel (CPICH).

For fast varying radio channels, the first tracking mode, i.e. a coarse tracking for moving user equipments is used. For stable or easily predictable radio channels, the second tracking mode is used, where precoding accuracy is increased step by step.

In a further refinement of the method, after a predefined number of steps, i.e. when certain accuracy is achieved, the system automatically switches to the second tracking mode. In the second tracking mode, the precoding matrix follows residual channel variations.

In one embodiment, the user equipment informs the base station about the number of steps based on knowledge of channel variability.

In another embodiment, the system remains in the second tracking mode as long as channel variations are below a threshold, i.e. as long as channel variations are smaller than a certain level of precoding accuracy. If this level is reached, the user equipment informs the base station to switch over to the first, coarse tracking mode.

Beneficial is the combination of feedback for unitary and non-unitary precoding weighting. First, each user equipment—here multi user MIMO is assumed—feeds back an index into a unitary precoding matrix of small size. By multi user scheduling the base station selects two user equipments which have fed back mutual orthogonal vectors so that small mutual interference can be assumed after precoding.

Subsequently, the accuracy of the precoding is stepwise increased by non unitary based feedback from each user equipment. This concept has the advantage that initially where all user equipments have to feed back information for selection of suitable user combinations the amount of feedback is small while for the next iterations with more resolution only the active user equipments have to send feedback information. Therefore, in one embodiment the two tracking modes are used intermittently, e.g. one step with the first tracking mode and two steps with the second tracking mode.

In another embodiment, the first tracking mode is based on unitary precoding, and the second tracking mode is a non unitary tracking mode. Unitary tracking mode is defined as $W*W'=I$, where W is the precoding matrix, W' the hermitian matrix of W and I is the identity matrix. Non unitary tracking mode includes, e.g. fine adaptation of phase and amplitude of the pre-coding weighting.

Switching between the first tracking mode and the second tracking mode is defined or changed quite seldom, e.g. every radio frame, while the tracking of the radio channel is advantageously done on a faster scale, e.g. every Transmission Time Interval (TTI). This is possible as the basic channel characteristics like time variance or dimension of the radio channel vary only slowly.

From the view of codebook design, in case of the first tracking mode a subset of an overall codebook (i.e. a set of possible precoding matrices) is used, which leads to a reduced feedback rate. In the second tracking mode, the codebook size is not necessarily limited. For example, in one embodiment a codebook production rule is used, defining how from an actual tracking step a sub codebook can be generated with a finer granularity around the current operating point. The codebook production rule can further be repeatedly applied in an iterative way for achieving a finer precoding granularity from tracking step to tracking step, i.e. in case of beamforming in each following tracking step the angle difference between two adjacent beams is successively decreased so that the beam used by the user equipment adapts more and more accurately to the user equipment's position.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a block diagram of a communications system operating in a second, fine tracking mode

Figure 1:
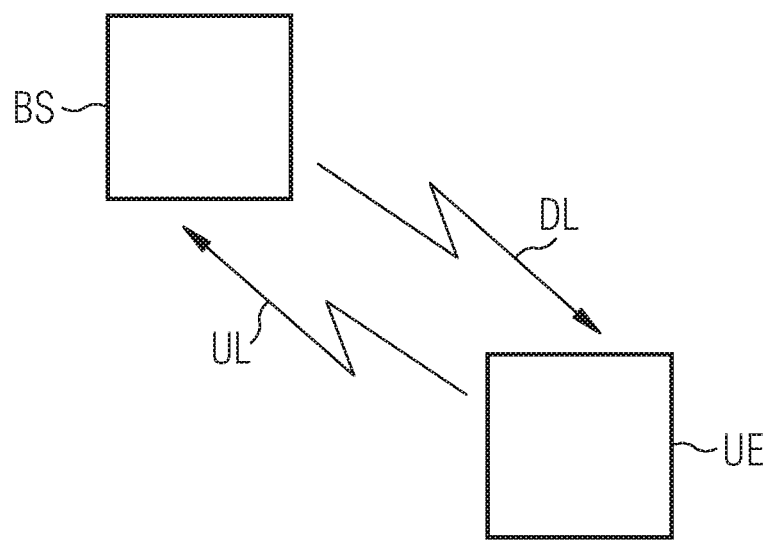
FIG. 1 is a block diagram illustrating components of a mobile communications system

DETAILED DESCRIPTION OF THE
PREFERRED EMBODIMENT

Reference will now be made in detail to the preferred embodiments, examples of which are illustrated in the accompanying drawings, wherein like reference numerals refer to like elements throughout.

FIG. 1 shows components of a mobile communications system with a base station BS and a user equipment UE. Data is transmitted from the base station BS to the user equipment UE on at least a downlink channel DL, and from the user equipment UE to the base station on at least an uplink channel UL.

Figure 2:
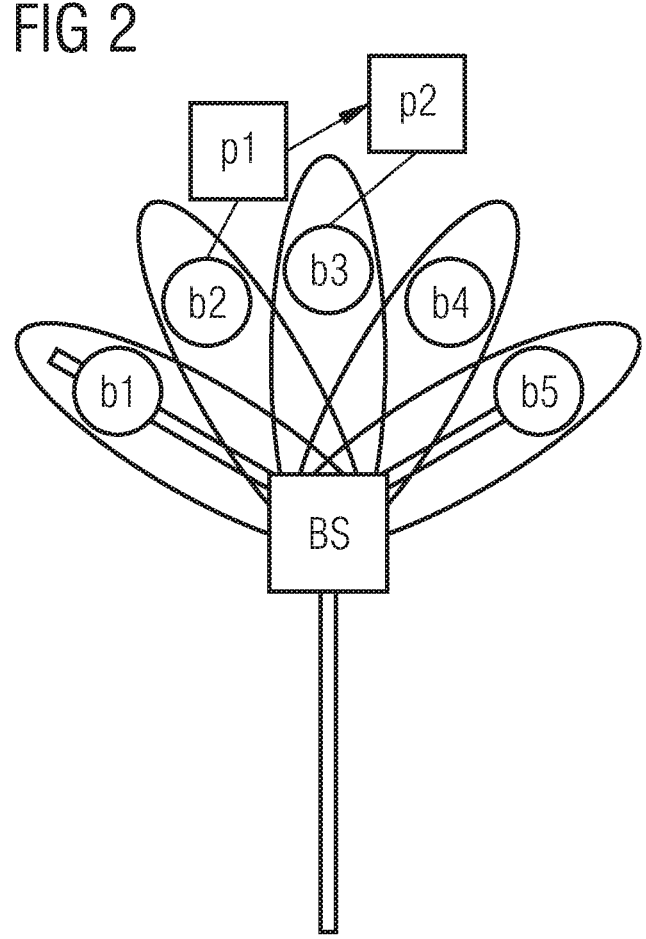
FIG. 2 is a block diagram of a communications system operating in a first, coarse tracking mode

FIG. 2 shows a communications system operating in a first, coarse tracking mode. In the following is described a communications system applying beamforming which is a special type of precoding. The embodiments are not limited to this type of communications system but may be used in all communications systems that are affected by at least one of the problems mentioned above.

FIG. 2 depicts the communications system operating in the above described first coarse tracking mode, applying beamforming as a variant of precoding the data.

Out of a predefined set of beams b1-b5, the best fitting is selected by the user equipment and used for transmission. When the user equipment moves from a first position p1 to a second position p2, the adjacent left or right beam is selected, i.e. the beams follow the moving user equipment. In the example shown in FIG. 2, located in the first position p1 the user equipment receives data on a second beam b2, while located in the second position p2, the user equipment receives data on a third beam b3 which is adjacent to the right of the second beam b2.

In case of a high number of beams, the tracking according to the first tracking mode advantageously saves feedback overhead compared to a full channel feedback.

FIG. 3 shows a communications system operating in a second, fine tracking mode in case of beamforming as precoding variant.

As in the scenario shown in FIG. 2, the first tracking mode is used to determine the best fitting beam out of a coarse set of beams is selected. In the scenario shown in FIG. 3, the user equipment's position is stable and therefore channel variability is low. Furthermore, the achieved precoding accuracy is not optimal, i.e. the variability of the channel is equal to or below a predefined threshold. Consequently, the base station switches to the second tracking. In the following tracking steps the angle difference between beams b6, b7, b8 is successively decreased so that the beam adapts more and more accurate to a third user equipment's position p3. The method results in system performance enhancements, as the precoding accuracy is improved by using the second tracking mode which offers a finer granularity as the first tracking mode with respect to the used codebooks.

The method has the advantage that the introduced second tracking mode reduces the feedback overhead in codebook based precoding MIMO schemes. While up to now tracking with codebooks has been proposed only to follow radio channel variations, the second tracking mode allows improving the precoding accuracy for radio channels with low time variance and/or low dimension of the radio channel over time.

The same structure of feedback with the same number of feedback bits can be reused for both tracking modes, where the meaning of the bits is changed depending on the applied MIMO mode.

The second tracking mode might be the only way to keep feedback overhead small and additionally implement more challenging MIMO algorithms like intra base station cooperation between sectors, which rely on quite accurate channel state information (CSI).

Without switching from the first tracking mode to the second tracking mode for a fixed feedback rate, a waste of resources might appear, as for a fixed (i.e. not moving) user equipment in the first tracking mode for each tracking step the same but not well fitting entry of the codebook is being used for precoding. In contrast, using the second tracking mode in such situation allows improving the system performance step by step.

As overall system gains for advanced MIMO algorithms are relevant only for larger data transmissions, the possible longer time period before a certain precoding accuracy is achieved is tolerable in comparison to a solution where a larger codebook size is used from the beginning of the transmission, as a large codebook size results in the above described large feedback overhead.

This method can be applied in all communications systems that are affected by at least one of the problems mentioned above.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for transmitting data in a mobile communications system, comprising:
    determining a set of predefined codebooks;
    transmitting the data on at least one channel between at least one base station with multiple antennas and at least one item of user equipment;
    applying, after the determining, at the base station precoding to the data based on the set of predefined codebooks, using, in a coarse tracking mode, a first codebook from the set of predefined codebooks for the precoding, and, in at least a fine tracking mode, using at least a second codebook from the set of predefined codebooks for the precoding, wherein the first codebook for use in a coarse tracking mode is associated with a coarse set of beams and the second codebook for use in a fine tracking mode is associated with a fine set of beams;
    wherein the second codebook used in the fine tracking mode provides a finer precoding granularity as compared to the first codebook used in the coarse tracking mode; and
    switching at the base station between the coarse tracking mode and the fine tracking mode depending on at least one condition of the at least one channel; and
    wherein a same number of feedback bits are used for both the fine tracking mode and the coarse tracking mode.

2. The method as claimed in claim 1, wherein the coarse tracking mode and the fine tracking mode are used intermittently.

3. The method as claimed in claim 2, wherein the coarse tracking mode is based on unitary precoding and the fine tracking mode is a non-unitary tracking mode.

4. The method as claimed in claim 1, further comprising: measuring a variability of the at least one channel to determine the at least one condition, and comparing the variability of the at least one channel with a threshold.

5. The method as claimed in claim 4, wherein said switching by the base station includes switching to the coarse tracking mode in case of the variability of the at least one channel exceeding the threshold.

6. The method as in claim 4, wherein said switching by the base station includes switching to the fine tracking mode in case of the variability of the at least one channel being not greater than the threshold.

7. The method as claimed in claim 6, wherein the condition is determined based on at least a long term channel estimation regarding the channel.

8. The method as claimed in claim 7, wherein said switching by the base station includes switching between the coarse tracking mode and the fine tracking mode based on a trigger.

9. The method as claimed in claim 8, further comprising sending the trigger to the base station by the user equipment.

10. The method as claimed in claim 1, wherein said applying the precoding is achieved by applying beamforming.

11. The method as claimed in claim 10, further comprising applying a predefined codebook production rule for producing a sub-codebook based on at least one of the first codebook and the second codebook in the fine tracking mode.

12. The method as claimed in claim 11, wherein the codebook production rule is repeatedly applied in an iterative way for achieving a finer precoding granularity.

13. The method of claim 1 wherein an angle difference between adjacent beams for the second codebook used in the fine tracking mode is less than an angle difference between adjacent beams for the first codebook used in the coarse tracking mode.

14. A base station in a mobile communications system, comprising:
at least one interface configured to receive and transmit data in the mobile communications system on at least one channel using multiple antennas; and
at least one processor configured to:
determine a set of predefined codebooks;
apply, after determining the set of predefined codebooks, precoding to the data based on the set of predefined codebooks, using, in a coarse tracking mode, a first codebook from the set of predefined codebooks for the precoding, using, in at least a fine tracking mode, at least a second codebook from the set of predefined codebooks for the precoding, wherein the first codebook for use in a coarse tracking mode is associated with a coarse set of beams and the second codebook for use in a fine tracking mode is associated with a fine set of beams, and wherein the second codebook used in the fine tracking mode provides a finer precoding granularity as compared to the first codebook used in the coarse tracking mode; and
switch between the coarse tracking mode and the fine tracking mode depending on at least one condition of the channel; and
wherein a same number of feedback bits are used for both the fine tracking mode and the coarse tracking mode.

15. The base station according to claim 14, wherein said at least one processor is further configured to apply a predefined codebook production rule for producing a sub-codebook based on at least one of the first codebook and the second codebook in the fine tracking mode.

16. The base station according to claim 15, wherein said at least one processor is configured to repeatedly apply the codebook production rule for achieving a finer precoding granularity.

17. The base station according to claim 14, wherein the base station is configured to communicate with at least one item of user equipment; and
wherein said at least one processor is further configured to switch between the coarse tracking mode and the fine tracking mode based on a trigger sent by the at least one item of user equipment.

18. A user equipment in a mobile communications system having at least one base station, comprising:
at least one interface configured to transmit data on at least one channel to the at least one base station using multiple antennas and to receive data, on the at least one channel from the at least one base station, to which the base station has determined a set of predefined codebooks and applied precoding data based on the determined set of predefined codebooks, using, in a coarse tracking mode, a first codebook from the set of predefined codebooks for the precoding, and, in at least a fine tracking mode, using at least a second codebook from the set of predefined codebooks for the precoding, wherein the first codebook for use in a coarse tracking mode is associated with a coarse set of beams and the second codebook for use in a fine tracking mode is associated with a fine set of beams, and wherein the second codebook used in the fine tracking mode provides a finer precoding granularity as compared to the first codebook used in the coarse tracking mode; and
at least one processor configured to cause the at least one interface to send a trigger to the at least one base station, the trigger causing the base station to switch between the coarse tracking mode and the fine tracking mode; and
wherein a same number of feedback bits are used for both the fine tracking mode and the coarse tracking mode.

19. The user equipment according claim 18, wherein the at least one processor is further configured to: determine at least one condition of at least one channel, perform a comparison of the at least one condition with a threshold, and decide whether to send the trigger to the at least one base station based on the comparison.

20. The user equipment according to claim 19, wherein the at least one processor is further configured to apply a predefined codebook production rule for producing a sub-codebook based on at least one of the first codebook and the second codebook in the fine tracking mode.

21. The user equipment according to claim 20, wherein said at least one processor is configured to repeatedly apply the codebook production rule for achieving a finer precoding granularity.

22. A communications system, comprising: at least one base station, including:
at least one interface configured to receive and transmit data in the mobile communications system on at least one channel using multiple antennas;
at least one processor configured to:
determine a set of predefined codebooks;
apply, after determining the set of predefined codebooks, precoding to the data based on the set of predefined codebooks, using, in a coarse tracking mode, a first codebook from the set of predefined codebooks for the precoding, using, in at least a fine tracking mode, at least a second codebook from the set of predefined codebooks for the precoding; and switch between the coarse tracking mode and the fine tracking mode depending on at least one condition of the channel, wherein the first codebook for use in a coarse tracking mode is associated with a coarse set of beams and the second codebook for use in a fine tracking mode is associated with a fine set of beams, and wherein the second codebook used in the fine tracking mode provides a finer precoding granularity as compared to the first codebook used in the coarse tracking mode; and at least one item of user equipment, including at least one interface configured to transmit and receive the data on the at least one channel to and from the at least one base station using multiple antennas; and wherein a same number of feedback bits are used for both the fine tracking mode and the coarse tracking mode.

* * * * *

UNITED STATES PATENT AND TRADEMARK OFFICE
CERTIFICATE OF CORRECTION

Page 1 of 1

PATENT NO. : 9,893,783 B2
APPLICATION NO. : 12/311737
DATED : February 13, 2018
INVENTOR(S) : Eichinger et al.

It is certified that error appears in the above-identified patent and that said Letters Patent is hereby corrected as shown below:

In the Claims

In Column 7, Line 9, Claim 6, delete "as" and insert -- as claimed --, therefor.

In Column 7, Line 34, Claim 13, delete "of claim 1" and insert -- as claimed in claim 1, --, therefor.

In Column 8, Line 41, Claim 19, delete "according" and insert -- according to --, therefor.

Signed and Sealed this
Twenty-sixth Day of May, 2020

Andrei Iancu
*Director of the United States Patent and Trademark Office*